United States Patent
Lee et al.

(10) Patent No.: US 10,136,450 B2
(45) Date of Patent: Nov. 20, 2018

(54) MULTIUSER FRAME TRANSMISSION METHOD IN WIRELESS LAN SYSTEM

(71) Applicant: LG ELECTRONICS INC., Seoul (KR)

(72) Inventors: Wookbong Lee, Seoul (KR); Kiseon Ryu, Seoul (KR); Jeongki Kim, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/328,858

(22) PCT Filed: Jul. 28, 2015

(86) PCT No.: PCT/KR2015/007832
§ 371 (c)(1),
(2) Date: Jan. 24, 2017

(87) PCT Pub. No.: WO2016/021858
PCT Pub. Date: Feb. 11, 2016

(65) Prior Publication Data

US 2017/0223731 A1 Aug. 3, 2017

Related U.S. Application Data

(60) Provisional application No. 62/033,651, filed on Aug. 6, 2014, provisional application No. 62/082,560, filed on Nov. 20, 2014.

(51) Int. Cl.
*H04W 74/00* (2009.01)
*H04W 74/08* (2009.01)
(Continued)

(52) U.S. Cl.
CPC ..... *H04W 74/006* (2013.01); *H04W 74/0816* (2013.01); *H04L 5/0023* (2013.01); *H04W 84/12* (2013.01)

(58) Field of Classification Search
CPC ........... H04W 74/006; H04W 74/0816; H04W 84/12; H04L 5/0023
See application file for complete search history.

(56) References Cited

U.S. PATENT DOCUMENTS 9,848,442 B2 * 12/2017 Kwon ............... H04W 74/0808
9,854,607 B1 * 12/2017 Chu ..................... H04W 52/241
(Continued)

FOREIGN PATENT DOCUMENTS

WO   WO 2011/129618 A2   10/2011
WO   WO 2013/169389 A    11/2013

OTHER PUBLICATIONS

Fischer et al., "CID 205 BSSID Color Bits," IEE 802.11-13/1207r1, Sep. 16, 2013, pp. 1-20.
(Continued)

*Primary Examiner* — Ajay Cattungal
(74) *Attorney, Agent, or Firm* — Birch, Stewart, Kolasch & Birch, LLP

(57) ABSTRACT

An embodiment of the present invention relates to a method for performing a clear channel assessment (CCA) by STA in a wireless communication system, the method comprising the steps of: receiving a frame including a coloring bit; changing a CCA level to a first level when the coloring bit indicates a basic service set (BSS) to which the STA belongs, and changing a CCA level to a second level when the coloring bit indicates a BSS to which the STA does not belong; and performing the CCA according to the first level or the second level, wherein when the frame has an OFDM-based format, the frame includes a coloring disable bit, and when the coloring disable bit indicates that the frame is a
(Continued)

multiuser transmission-related trigger frame, the STA does not perform a change of the CCA level without regard to information indicated by the coloring bit.

7 Claims, 8 Drawing Sheets

(51) Int. Cl.
*H04W 84/12* (2009.01)
*H04L 5/00* (2006.01)

(56) References Cited

U.S. PATENT DOCUMENTS

| | | | |
|---|---|---|---|
| 9,860,917 B2* | 1/2018 | Oh | H04W 74/0816 |
| 2009/0003299 A1 | 1/2009 | Cave et al. | |
| 2012/0057534 A1 | 3/2012 | Park | |
| 2012/0327915 A1 | 12/2012 | Kang et al. | |
| 2015/0146654 A1* | 5/2015 | Chu | H04W 72/1289 |
| | | | 370/329 |
| 2015/0264617 A1* | 9/2015 | Choudhury | H04W 36/30 |
| | | | 370/332 |
| 2015/0312941 A1* | 10/2015 | Oh | H04W 74/0816 |
| | | | 370/338 |
| 2015/0365940 A1* | 12/2015 | Chu | H04B 7/0452 |
| | | | 370/329 |
| 2016/0301491 A1* | 10/2016 | Porat | H04W 24/08 |
| 2016/0302156 A1* | 10/2016 | Choi | H04W 52/146 |
| 2016/0353275 A1* | 12/2016 | Liu | H04W 8/26 |
| 2016/0353480 A1* | 12/2016 | Choi | H04L 43/16 |
| 2016/0374085 A1* | 12/2016 | Chun | H04W 52/146 |
| 2017/0013645 A1* | 1/2017 | Choi | H04W 74/0816 |
| 2017/0027001 A1* | 1/2017 | Choi | H04W 74/0816 |
| 2017/0104570 A1* | 4/2017 | Kim | H04L 5/0055 |
| 2017/0127352 A1* | 5/2017 | Park | H04W 52/0225 |
| 2017/0149547 A1* | 5/2017 | Kim | H04L 5/0055 |
| 2017/0171861 A1* | 6/2017 | Seok | H04W 72/0453 |
| 2017/0188306 A1* | 6/2017 | Park | H04W 52/0245 |
| 2017/0208153 A1* | 7/2017 | Li | H04L 69/22 |
| 2017/0208546 A1* | 7/2017 | Park | H04W 52/02 |

OTHER PUBLICATIONS

Jiang et al., "System Level Simulations on Increased Spatial Reuse," IEEE 802.11-14/0372r2, Mar. 17, 2014, pp. 1-9.
Son et al., "Further Considerations on Enhanced CCA for 11ax," IEEE, 802.11-14/0847r0, Jul. 15, 2014, pp. 1-12.

* cited by examiner

MULTIUSER FRAME TRANSMISSION METHOD IN WIRELESS LAN SYSTEM

CROSS REFERENCE TO RELATED APPLICATIONS

This application is the National Phase of PCT International Application No. PCT/KR2015/007832, filed on Jul. 28, 2015, which claims priority under 35 U.S.C. 119(e) to U.S. Provisional Application Nos. 62/033,651, filed on Aug. 6, 2014, and 62/082,560 filed on Nov. 20, 2014, all of which are hereby expressly incorporated by reference into the present application.

TECHNICAL FIELD

The present invention relates to a method of transmitting a multi-user frame in a wireless communication system and a station device for performing the same.

BACKGROUND ART

First of all, a wireless local area network (WLAN) system is described as one example of a system to which the present invention is applicable.

The standard for WLAN (wireless local area network) technology is being developed as IEEE (institute of electrical and electronics engineers) 802.11 standard. IEEE 802.11a/b uses an unlicensed band on 2.4 or 5 GHz. The IEEE 802.11b provides a data rate of 11 Mbps, while the IEEE 802.11a provides a data rate of 54 Mbps. IEEE 802.11g applies OFDM (orthogonal frequency division multiplexing) on 2.4 GHz to provide a data rate of 54 Mbps. IEEE 802.11n applies MIMO-OFDM (multiple input multiple output-OFDM) to provide a data rate of 300 Mbps for 4 spatial streams. The IEEE 802.11n supports channel bandwidths up to 40 MHz. In this case, a data rate of 600 Mbps is provided.

The aforementioned WLAN standard uses a bandwidth up to maximum 160 MHz and supports 8 spatial streams, and there is an ongoing discussion about IEEE 802.11ax standardization through IEEE 802.11ac standard supportive of a speed of maximum 1 Gbit/s.

DISCLOSURE OF THE INVENTION

Technical Task

The technical task of the present invention is to provide a method of transmitting a multi-user frame, and more particularly, how an STA handles synchronization for a multi-user frame transmission.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing CCA (clear channel assessment), which is performed by an STA in a wireless communication system, includes the steps of receiving a frame including a coloring bit, if the coloring bit indicates a BSS (basic service set) to which the STA belongs thereto, changing a CCA level to a first level, if the coloring bit indicate a BSS to which the STA does not belong, changing the CCA level to a second level, and performing the CCA according to the first level or the second level. In this case, if the frame corresponds to an OFDM-based frame format, the frame includes a coloring disable bit and if the coloring disable bit indicates that the frame corresponds to a trigger frame related to multiuser transmission, the STA does not perform the change of the CCA level irrespective of information indicated by the coloring bit.

To further achieve these and other advantages and in accordance with the purpose of the present invention, according to a different embodiment, an STA performing CCA in a wireless communication system includes a reception module and a processor, the processor configured to receive a frame including a coloring bit, the processor, if the coloring bit indicates a BSS (basic service set) to which the STA belongs thereto, configured to change a CCA level to a first level, the processor, if the coloring bit indicate a BSS to which the STA does not belong, configured to change the CCA level to a second level, the processor configured to perform the CCA according to the first level or the second level. In this case, if the frame corresponds to an OFDM-based frame format, the frame includes a coloring disable bit and if the coloring disable bit indicates that the frame corresponds to a trigger frame related to multiuser transmission, the STA does not perform the change of the CCA level irrespective of information indicated by the coloring bit.

If the coloring disable bit indicates that the frame corresponds to the trigger frame related to the multiuser transmission, the change of the CCA level can be performed when an uplink frame related to the trigger frame is received.

The STA can obtain information on a protection section by decoding the frame.

The STA may not perform transmission in the protection section.

If the coloring bit indicates the BSS to which the STA belongs thereto, the STA may not perform transmission in a protection section irrespective of the first level.

If the coloring bit indicates the BSS to which the STA does not belong and a reception level of the uplink frame is higher than the second level, the STA may not perform transmission in a protection section.

If the coloring bit indicates the BSS to which the STA does not belong and a reception level of the uplink frame is lower than the second level, the STA may perform transmission in a protection section.

The first level may correspond to a value lower than a case that the change of the CCA level is not performed and the second level may correspond to a value higher than the case that the change of the CCA level is not performed.

The frame may correspond to a HE-PPDU (high efficiency PLCP protocol data unit) frame.

The coloring bit and the coloring disable bit can be included in a HE-SIG field.

If the frame is not the OFDM-based frame format, the STA can decode the frame to recognize that the frame corresponds to the trigger frame related to the multiuser transmission.

The STA can decode the frame to obtain information on a protection section.

Advantageous Effects

According to the present invention, STAs can adjust synchronizations efficiently and transmit multi-user frames.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

In the following detailed description of the invention includes details to help the full understanding of the present invention. Yet, it is apparent to those skilled in the art that the present invention can be implemented without these details. Occasionally, to prevent the present invention from getting vaguer, structures and/or devices known to the public may be skipped or represented as block diagrams centering on the core functions of the structures and/or devices.

As mentioned in the foregoing description, the following description relates to a method of transmitting a frame in a WLAN system and station device for performing the same. To this end, a WLAN system to which the present invention is applied is described in detail.

Figure 1:
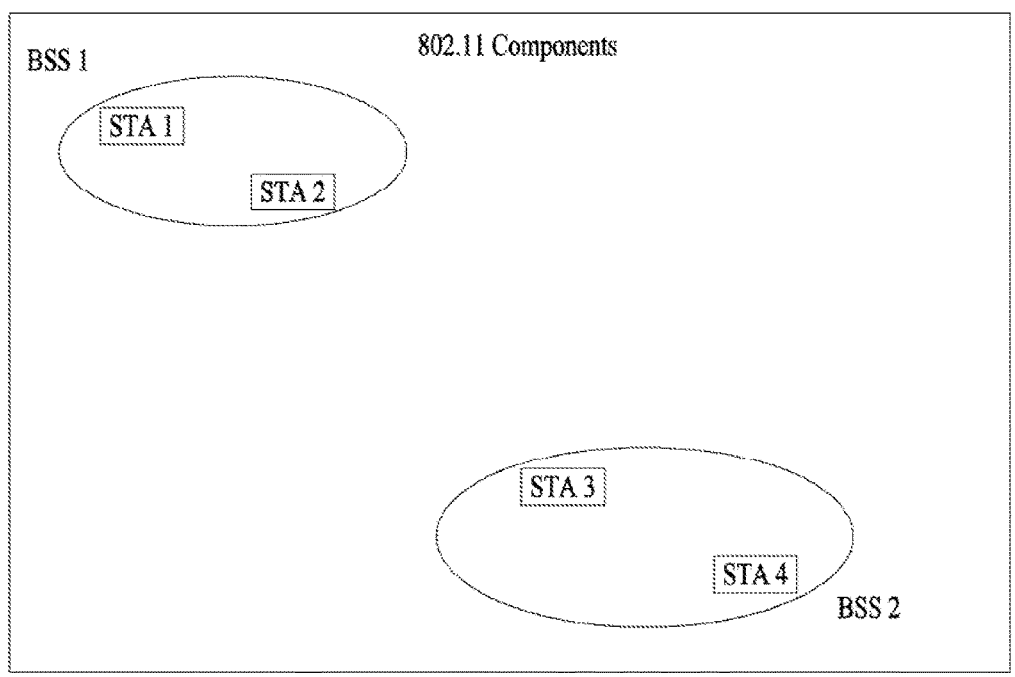
FIG. 1 is a diagram for one example of a configuration of a WLAN system.

FIG. 1 is a diagram for one example of a configuration of a WLAN system.

Referring to FIG. 1, a WLAN system includes at least one basic service set (BSS). The BSS is a set of stations (STAs) capable of communicating with each other by successfully establishing synchronization.

The STA is a logical entity including a medium access control (MAC) and a physical layer interface for a radio medium, and includes an access point (AP) STA and a non-AP STA (station). When it is simply called an AP, it indicates an AP STA. When it is called an STA, it may indicate a non-AP STA. The non-AP STA may be called another name such as a terminal, a wireless transmit/receive unit (WTRU), a user equipment (UE), a mobile station (MS), a mobile terminal, a mobile subscriber unit, or the like.

And, the AP is an entity that provides an associated STA, which is associated with the corresponding AP, with an access to a distribution system (DS) through a radio medium. The AP may be called a concentrated controller, a base station (BS), a Node-B, a BTS (base transceiver system), a site controller, or the like.

The BSS may be classified into an infrastructure BSS and an independent BSS.

The BSS shown in FIG. 1 is an IBSS. The IBSS means a BSS failing to include an AP. As the IBSS does not include the AP, an access to the DS is not granted, thereby configuring a self-contained network.

Figure 2:
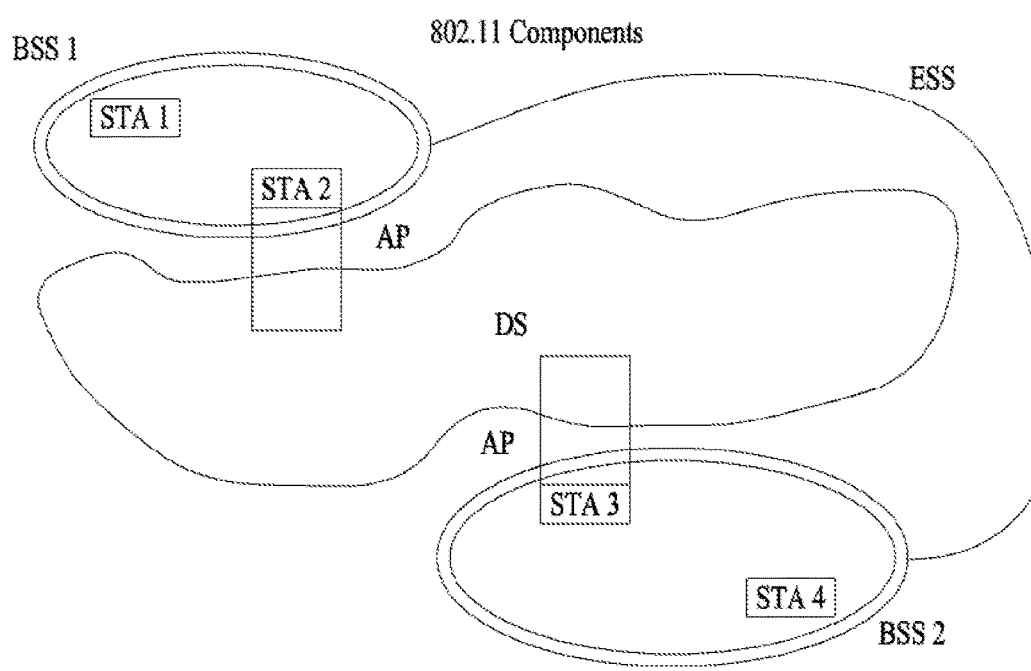
FIG. 2 is a diagram for another example of a configuration of a WLAN system.

FIG. 2 is a diagram for another example of a configuration of a WLAN system.

BSS shown in FIG. 2 is an infrastructure BSS. The infrastructure BSS includes at least one STA and at least one AP. In the infrastructure BSS, although communications between non-AP STAs are basically performed via AP, if a direct link is established between the non-AP STAs, a direct communication between the non-AP STAs is possible.

Referring to FIG. 2, a plurality of infrastructure BSSs may be mutually connected to each other through DS. A plurality of BSSs connected through DS are called an extended service set (ESS). STAs included in the ESS can communicate with each other. In the same ESS, a non-AP STA can move away from one BSS into another BSS by performing a seamless communication.

The DS is a mechanism for connecting a plurality of APs. It may be unnecessary for the DS to be a network. If the DS is able to provide a prescribed distribution service, no restriction is put on a type of the DS. For instance, the DS may include such a wireless network as a mesh network or a physical structure for connecting APs to each other.

Based on the above description, a frame structure usable in a WLAN system is described.

Figure 3:
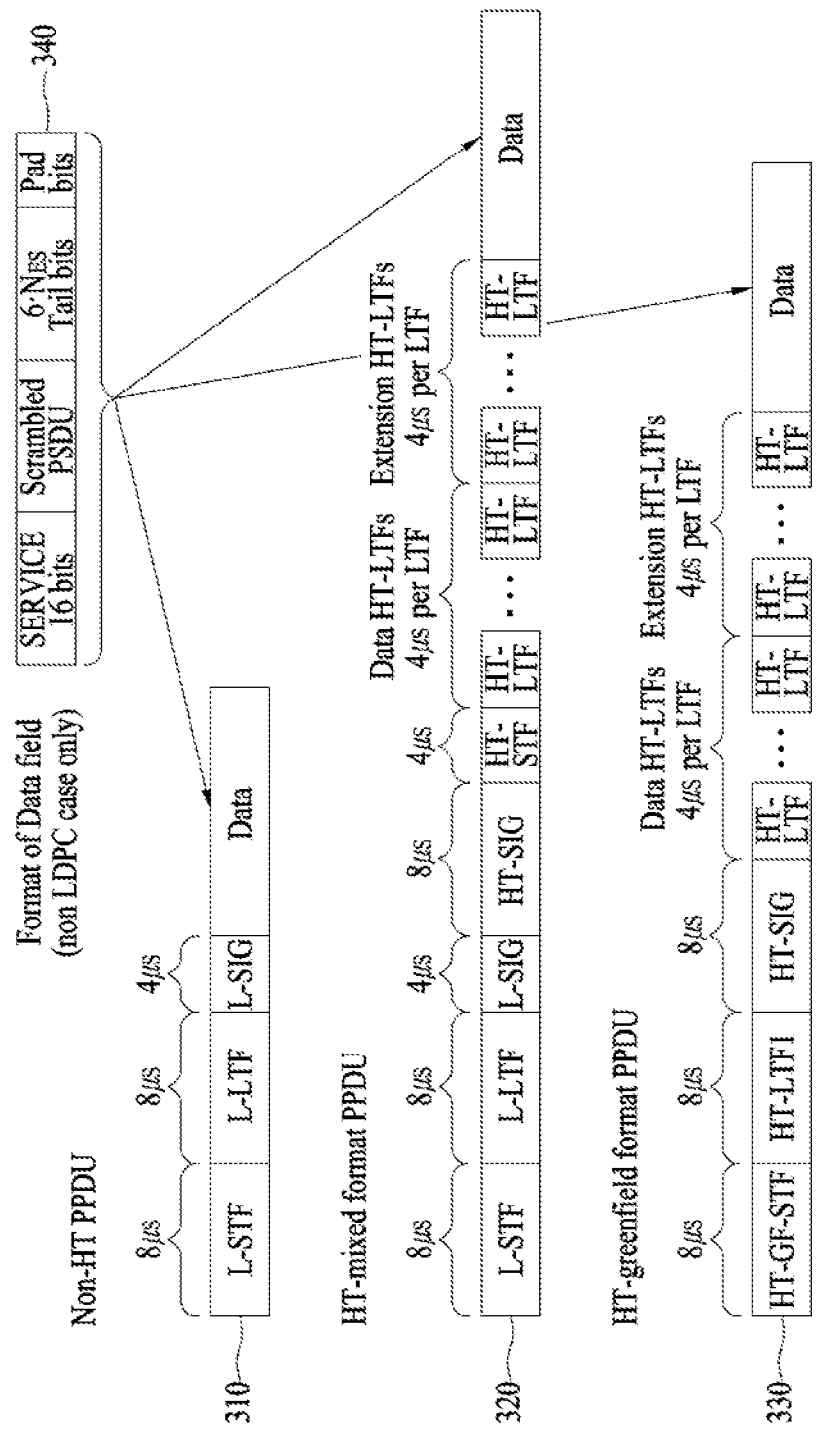
FIG. 3 is a diagram to describe a frame structure usable in a WLAN system.

FIG. 3 is a diagram to describe a frame structure usable in a WLAN system.

In particular, a reference number '310' shown in FIG. 3 denotes a physical layer protocol data unit (PPDU) for user equipments according to IEEE 802.11a/g standard, and reference numbers 320 and 330 denote PPDU formats for user equipments according to IEEE 802.11n standard. As shown in FIG. 3, a user equipment supportive of IEEE 802.11n system uses a frame denoted by 'HT-'.

In more particular, the reference number 320 and the reference number 330 denote HT-mixed format PPDU and HT-greenfield format PPDU of IEEE 802.11n user equipment, respectively.

A reference number 340 denotes a configuration of a data region in each PPDU, and the data region includes PSDU (Physical Service Data Unit).

Figure 4:
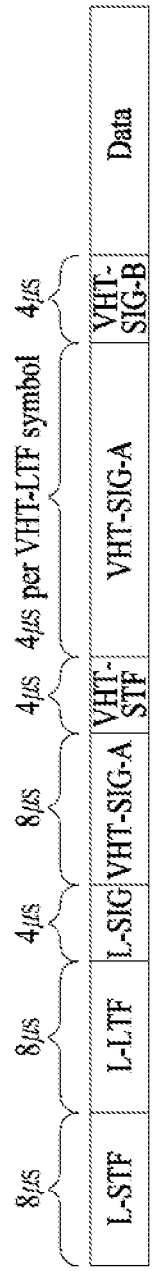
FIG. 4 shows a frame format according to IEEE 802.11ac standard technology.

FIG. 4 shows a frame format according to IEEE 802.11ac standard technology.

Referring to FIG. 4, a user equipment according to IEEE 802.11ac standard supports a field denoted by 'VHT-'.

In particular, fields shown in FIG. 4 are described as follows.

TABLE 1

| Field | Description |
| --- | --- |
| L-STF | Non-HT Short Training field |
| L-LTF | Non-HT Long Training field |

TABLE 1-continued

| Field | Description |
|---|---|
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT SIGNAL B field |
| Data | The Data field carries the PSDU(s) |

Inter-Frame Space (IFS)

A time space between two frames may be defined as IFS (inter-frame space). An STA may determine whether a channel is used for IFS through a carrier sensing. A DCF MAC layer defines 4 types of IFSs, by which a priority in occupying a radio medium can be determined.

IFS may be set to a specific value according to a physical layer irrespective of a bit rate of STA. Types of IFS may include SIFS (Short IFS), PIFS (PCF IFS), DIFS (DCF IFS), and EIFS (Extended IFS). The SIFS (Short IFS) is used for RTS/CTS and ACK frame transmission and may have a top priority. The PIFS (PCF IFS) is used for PCF frame transmission, and the DIFS (DCF IFS) may be used for DCF frame transmission. The EIFS (Extended IFS) is used for a case of frame transmission error occurrence only and does not have a fixed space.

Figure 5:
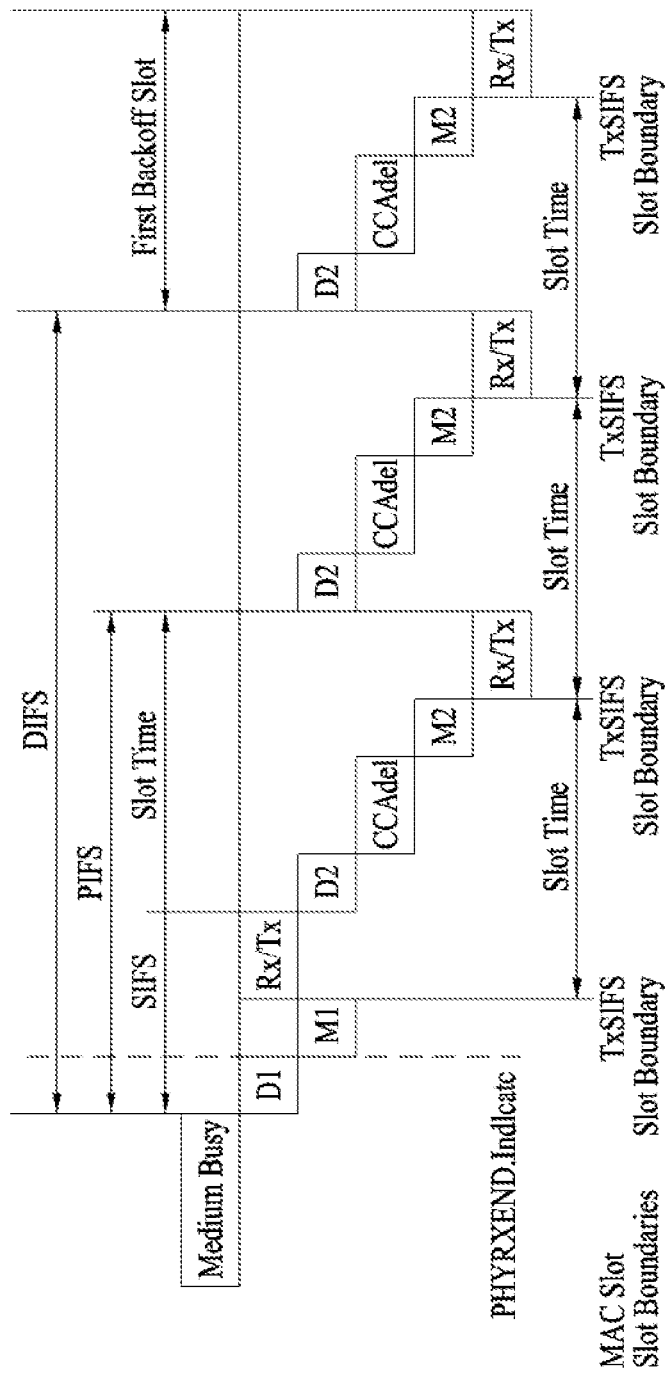
FIG. 5 is a diagram to describe a frame time gap.

Each relationship between the respective IFSs is defined as a time gap on a medium, and related attributes are provided by a physical layer, as shown in FIG. 5.

FIG. 5 is a diagram for one example of IFS relationship. Regarding all medium timings, an end timing point of a last symbol of a PPDU indicates a transmission end, and a first symbol of a preamble of a next PPDU indicates a transmission start. All MAC timings can be defined by referring to PHY-TXEND.confirm primitive, PHYTXSTART.confirm primitive, PHY-RXSTART.indication primitive and PHY-RXEND.indication primitive.

Referring to FIG. 5, an SIFS time (aSIFSTime) and a slot time (aSlotTime) may be determined per physical layer. The SIFS time has a fixed value, and the slot time may dynamically change according to an air propagation time (aAirPropagationTime) change. SIFS, PIFS and DIFS can be defined as Formulas 1 to 3, respectively. And, a value within a parenthesis in each formula includes a numerical value that is used in general. Yet, such a value may vary per user equipment and/or location.

$a$SIFS(16 us)=$a$RXRFDelay(0.5)+$a$RXPLCPDelay(12.5)+$a$MACProcessiong Delay(11 or <2)+$a$RXTXturnaroundTime(<2)−$a$RxTxTurnaroundTime=$a$TxPLCPDelay(1)+$a$RxTxSwitchTime(0.25)+$a$TxRampOnTime(0.25)+$a$TxRFDelay(0.5)  [Formula 1]

PIFS(25 us)=$a$SIFSTime+$a$SlotTime
$a$SlotTime=aCCATime(<4)+$a$RxTxTurnaroundTime(<2)+$a$AirPropagationTime(<1)+$a$MACProcessingDelay(<2)  [Formula 2]

(aAirPropagationTime: The default PHY parameter are based on aAirPropagationTime Having a value of 1 us or less. Radio wavespropagate at 300 m/us in free space, and, for example, 3 us would be the ceiling for BSS maximum one-way distance of ~450 m (~900 m round trip))

DIFS(34 us)=$a$SIFSTime+2*$a$SlotTime  [Formula 3]

Figure 6:
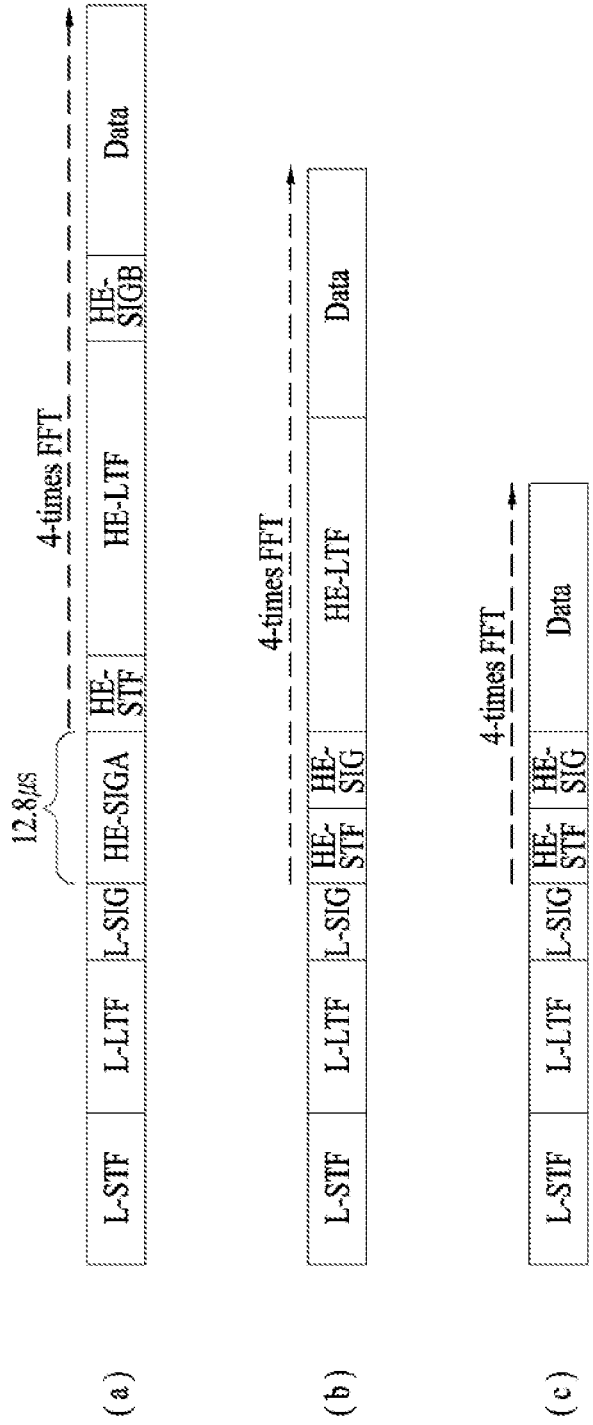
FIG. 6 and FIG. 7 are diagrams to describe a method of transmitting a multi-user frame according to an embodiment of the present invention.

FIG. 6 illustrates an example of a HE-PPDU (high efficiency PLCP protocol data unit) frame format capable of being applied to embodiments of the present invention.

Referring to an example of FIG. 6(a), it may include 12.8 μs HE-SIGA field, 1 symbol HE-STF field, HE-LTF field, and 1 symbol HE-SIGB field. It may be able to apply 256, 512, 1024, and 2048 FFT to 20 MHz, 40 MHz, 80 MHz, and 160 MHz HE PPDU format, respectively, from the start of the HE-STF. A length of a HE PPDU preamble may correspond to 8(L-STF)+8(L-LTF)+4(L-SIG)+12.8(HE-SIGA)+16(HE-STF)+X(times)16(HE-LTF)+16(HE-SIGB)=80.8 us (X=1 case).

Referring to FIG. 6(b), a PPDU format can include 1 symbol HE-STF field, 1 symbol HE-SIG field, and HE-LTF field. It may be able to apply 256, 512, 1024, and 2048 FFT to 20 MHz, 40 MHz, 80 MHz, and 160 MHz HE PPDU format, respectively, from the start of the HE-STF. A length of HE PPDU preamble may correspond to 8(L-STF)+8(L-LTF)+4(L-SIG)+16(HE-STF)+16(HE-SIGA)+X(times)16(HE-LTF)=68 us (X=1 case).

Referring to FIG. 6(c), a PPDU format can include 1 symbol HE-STF field and 1 symbol HE-SIG field. It may be able to apply 256, 512, 1024, and 2048 FFT to 20 MHz, 40 MHz, 80 MHz, and 160 MHz HE PPDU format, respectively, from the start of the HE-STF. A length of HE PPDU preamble may correspond to 8(L-STF)+8(L-LTF)+4(L-SIG)+16(HE-STF)+16(HE-SIGA)=52 us.

IEEE 802.11ax considers a case that there are huge number of STAs and APs. In this case, in order to increase a frequency reuse rate, various methods are used to increase a CCA level.

For example, if a reference for determining whether or not a medium is busy (in case of preamble detection) is changed to −70 dBm from −82 dBm and a signal is received by −75 dBm, the medium can be determined as idle based on the newly changed CCA level although the medium is determined as busy based on the legacy CCA level. In this case, it is necessary to determine whether or not STAs belong to the same BSS (a set including STAs communicating with the same AP and the AP). More specifically, if the STAs belong to the same BSS, since the STAs perform transmission to the same reception station or perform transmission to the same transmission device, collision/interference may occur.

In order to solve the collision/interference problem, it may be able to use BSS coloring. Specifically, BSS coloring bits can be differently set according to a BSS. An STA receives a signal and checks the BSS coloring bit. If a BSS corresponds to a BSS to which the STA belongs thereto, although a signal of a very low level is received, the STA may not transmit a signal. If a BSS corresponds to a BSS to which the STA does not belong, the STA can determine whether or not a medium is busy based on the newly changed CCA level.

Figure 7:
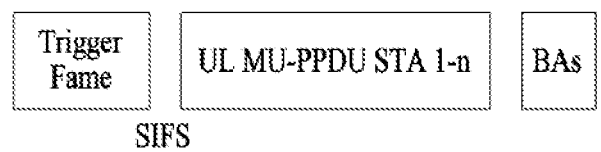

Meanwhile, according to 802.11ax, an AP accesses a medium to perform multiuser uplink transmission. If the medium is idle, the AP can transmit a trigger frame (or CTX frame) based on OFDM. An STA indicated by the trigger frame can transmit an uplink data. In this case, uplink allocation information included in the trigger frame can be transmitted via MAC data or a physical control channel (e.g., HE-SIG). FIG. 7 briefly shows transmission of the trigger frame and uplink transmission of multiuser (MU).

In the following, methods for performing efficient transmission by applying BSS coloring in 802.11ax environment are explained when a CCA level is changed.

Embodiment 1

As mentioned in the foregoing description, if an STA receives a frame including a coloring bit and the coloring bit indicates a BSS to which the STA belongs thereto, the STA can change a CCA level to a first level. If the coloring bit indicates a BSS to which the STA does not belong, the STA can change the CCA level to a second level. Subsequently, the STA can perform CCA according to the first level or the second level. In this case, the first level may correspond to a value lower than a value of a case that the change of the CCA level is not performed. The second level may correspond to a value higher than the value of the case that the change of the CCA level is not performed. For example, if the first level is set to 0 and a signal is received from a BSS to which an STA belongs, it may be able to make the STA determine that a medium is always busy.

If the received frame corresponds to an OFDM-based frame format (i.e., a trigger frame or a CTX frame), the frame can include a coloring disable bit. And, if the coloring disable bit indicates that the frame corresponds to a trigger frame related to multiuser transmission, the STA may not perform the change of the CCA level irrespective of information indicated by the coloring bit. In particular, the coloring disable bit (This term is just an example only. A bit and an indicator enabling an operation according to the explanation of the present invention to be performed are included in the scope of the present invention) is included in the trigger frame and the coloring disable bit plays a role in indicating that a current frame corresponds to a trigger frame. Since a current frame corresponds to a trigger frame, the coloring disable bit can also be comprehended as a bit indicating that CCA level change is not performed and whether or not a medium is busy is not determined.

If the coloring disable bit indicates that the frame corresponds to a trigger frame related to multiuser transmission, the change of the CCA level can be performed when an uplink frame related to the trigger frame is received. In particular, if a trigger frame is received from an AP, uplink frames of STAs are transmitted in response to the trigger frame. Hence, the trigger frame indicates that the change of the CCA level is not performed and whether or not a medium is busy is not determined. If the change of the CCA level is performed, whether or not a medium is busy is determined, and the STA performs transmission in relation to the trigger frame, it works as interference for receiving an uplink signal related to the trigger frame.

Subsequently, the STA decodes the frame to obtain information on a protection section and the STA does not perform transmission in the protection section.

If a coloring bit indicates a BSS to which an STA belongs thereto, the STA may not perform transmission in a protection section irrespective of the first level.

If a coloring bit indicates a BSS to which an STA does not belong and a reception level of the uplink frame is higher than the second level, the STA may not perform transmission in a protection section. If a coloring bit indicates a BSS to which an STA does not belong and a reception level of the uplink frame is lower than the second level, the STA can perform transmission in a protection section.

If a frame is not an OFDM-based frame format, i.e., if a coloring bit is transmitted by a frame rather than 802.11ax frame format, an STA can recognize that the frame corresponds to a trigger frame related to multiuser transmission by decoding the frame. And, the STA can obtain information on a protection section by decoding the frame.

A trigger frame corresponds to a HE-PPDU (high efficiency PLCP protocol data unit) frame and a coloring bit and a coloring disable bit can be included in HSIG field.

In the foregoing description, it may use a reserved field of a legacy BSS coloring bit (BSS-IS bit) field without separately defining a coloring disable bit.

Embodiment 2

In line with the embodiment 1, when a trigger frame is transmitted by a device belonging to the same BSS, if an STA hears the trigger frame, the STA may not perform transmission during a protection section without applying to a CCA level. If the STA fails to hear the trigger frame and hears a UL data, the STA may not perform transmission during the protection section without applying to the CCA level.

Meanwhile, if a trigger frame is transmitted by a device belonging to a different BSS, the device belonging to the different BSS can operate as follows.

First of all, if the trigger frame is higher than a new CCA level, the device may not perform transmission during a protection section.

Secondly, if the trigger frame is not higher than the new CCA level (waits) and the UL data is higher than the new CCA level, the device may not perform transmission during the protection section.

Thirdly, if the trigger frame is not higher than the new CCA level and the UL data is not higher than the new CCA level, the device determines that a medium is idle and may be then able to perform backoff and data transmission.

Embodiment 3

Embodiment 3 relates to an RTS frame and a CTS frame rather than a trigger frame.

If the RTS/CTS is transmitted by 802.11ax frame format, a device recognizes that a frame of 802.11ax corresponds to the RTS/CTS. In this case, a transmitter of the RTS/CTS sets a BSS coloring disable bit included in HE-SIG of the 802.11ax frame to 1 to indicate that the frame corresponds to the RTS/CTS frame. In this case, the device can obtain a protection section by additionally decoding the frame (L-SIG or MAC duration).

If the RTS/CTS is transmitted by a device belonging to the same BSS, the device belonging to the BSS can perform operations described in the following in each case.

If an STA hears RTS and CTS, the STA may not perform transmission during a protection section without applying to a CCA level. If the STA hears the RTS, fails to hear the CTS, and receives data from a device from which the RTS is sent, the STA may not perform transmission during the protection section without applying to the CCA level. If the STA hears the RTS, fails to hear the CTS, and fails to hear data transmission transmitted from the device from which the RTS is sent, the STA terminates NAV (or TXOP) and may be able to perform a backoff procedure again. If the STA fails to hear the RTS and hears the CTS, the STA may not perform transmission during the protection section without applying to the CCA level.

If RTS/CTS is transmitted by a device belonging to a different BSS, the device belonging to the different BSS can operate as follows.

If the RTS and the CTS are higher than a new CCA level, the device may not perform transmission during a protection section. If the RTS is higher than the new CCA level, the CTS is not higher than the new CCA level, and data transmitted from the device from which the RTS is sent is higher than the new CCA level, the device may not perform transmission during the protection section. If the RTS is higher than the new CCA level, the CTS is not higher than the new CCA level, and the data transmitted from the device from which the RTS is sent is not higher than the new CCA level, the device terminates NAV (or TXOP) and may be able to perform a backoff procedure again. If the RTS is not higher than the new CCA level and the CTS is higher than the new CCA level, the device may not perform transmission during the protection section.

In the foregoing description, when the RTS/CTS is lower than the new CCA level, it includes a case that a frame is not recognized due to a too low signal level.

If the RTS/CTS is transmitted by a frame rather than the 802.11ax frame format, a device decodes the frame to recognize that the frame corresponds to the RTS/CTS and obtain a protection section.

According to the aforementioned embodiments, when RTS, CTS, or a trigger frame/CTX is transmitted by 802.11ax frame format, a device receiving the frame is able to know that the frame corresponds to the RTS, the CTS, or the CTX by adding not only a BSS coloring bit but also a coloring disable bit and apply CCA using a method different from other frame.

In this case, TXOP duration can be obtained via a length field of L-SIG or MAC duration of a corresponding PPDU. When the TXOP duration is indicated by the length field of the L-SIG, HE-SIG can additionally indicate a length of a PPDU. In addition, since a device for transmitting the CTS corresponds to a UL data reception station (i.e., an AP), if the device for transmitting the CTS and a device causing interference are located at a location mutually affected by strong interference, it may be able to determine that a medium is busy irrespective of a signal size of a device that transmits UL data.

Configurations of Apparatuses According to Embodiment of the Present Invention

Figure 8:
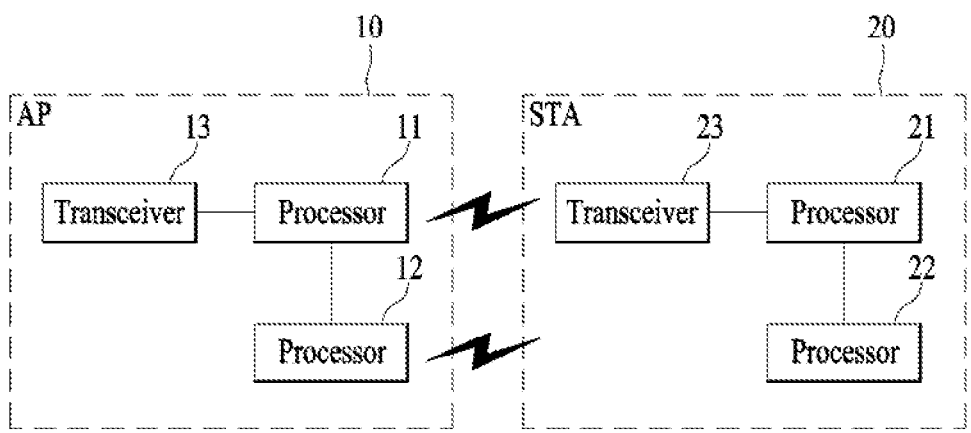
FIG. 8 is a diagram to illustrate a configuration of a transceiving device.

FIG. 8 is a block diagram for a configuration of a wireless device according one embodiment of the present invention.

An AP 10 can include a processor 11, a memory 12, and a transceiver 13. An STA 20 can include a processor 21, a memory 22, and a transceiver 23. The transceiver 13/23 can transmit and receive a radio signal. For example, the transceiver can implement a physical layer according to IEEE 802 system. The processor 11/21 can implement a physical layer and/or a MAC layer according to IEEE 802 system in a manner of being connected with the transceiver 13/23. The processor 11/21 can be configured to perform operations according to the aforementioned various embodiments of the present invention. And, a module for implementing the operations of the AP and the STA according to various embodiment of the present invention is stored in the memory 12/22 and can be executed by the processor 11/21. The memory 12/22 is included in the inside of the processor 11/21 or is installed in the outside of the processor 11/21 and can be connected with the processor 11/21 via a well-known means.

The above AP and the STA may be configured in such a manner that the above-described various embodiments of the present invention may be implemented independently or in combination of two or more. A redundant description is omitted for clarity.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The above-described embodiments of the present invention are applicable to various mobile communication systems.

What is claimed is:

1. A method of receiving a downlink (DL) signal by a station (STA) in a wireless communication system, the method comprising:
   receiving, by the STA, a DL signal including coloring information indicating a basic service set (BSS); and
   performing, by the STA, uplink (UL) transmission,
   wherein when the DL signal corresponds to a trigger frame, the DL signal includes information indicating a delay of a resource reuse related operation, and
   wherein when the DL signal includes the information indicating the delay of the resource reuse related operation and the coloring information indicates the BSS to which the STA does not belong, the STA delays the UL transmission according to the resource reuse related operation.

2. The method of claim 1, wherein the information indicating the delay restriction of the resource reuse related operation is included in a high efficiency signal (HE-SIG) field.

3. The method of claim 2, wherein the DL signal corresponds to a high efficiency physical layer protocol data unit (HE PPDU).

4. The method of claim 3, wherein the HE-SIG field is included in the HE PPDU.

5. The method of claim 2, wherein the information indicating the delay of the resource reuse related operation corresponds to a basic service set (BSS) disable bit.

6. The method of claim 1, wherein the resource reuse related operation corresponds to a clear channel assessment (CCA) level change.

7. A station (STA) for receiving a downlink (DL) signal in a wireless communication system, the STA comprising:
   a receiver; and
   a processor,
   wherein the processor is configured to:

control the receiver to receive a DL signal including coloring information indicating a basic service set (BSS), and perform uplink (UL) transmission, wherein when the DL signal corresponds to a trigger frame, the DL signal includes information indicating a delay a resource reuse related operation, and wherein when the DL signal includes the information indicating the delay of the resource reuse related operation and the coloring information indicates a BSS to which the STA does not belong, the STA delays the UL transmission according to the resource reuse related operation.

* * * * *